(No Model.)
J. MEEHAN.
BRAKE SHOE.
No. 354,724. Patented Dec. 21, 1886.
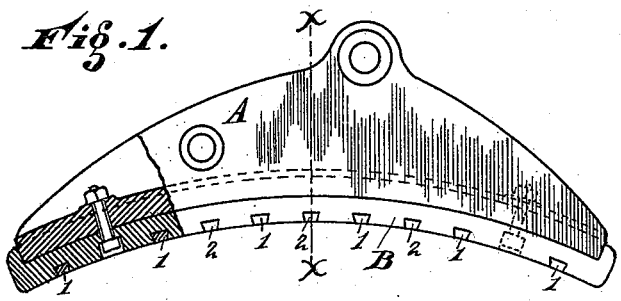
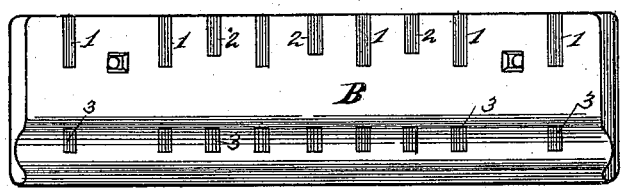
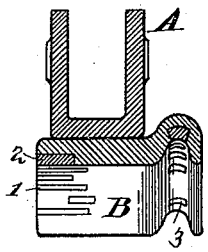
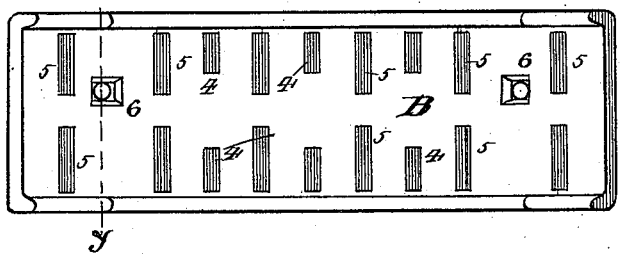
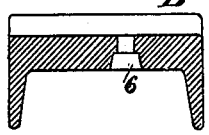
Attest
J. Watson Sims
Jno. S. Roebuck Jr.
Inventor
James Meehan
by Wood & Boyd
his Attorneys &c

UNITED STATES PATENT OFFICE.

JAMES MEEHAN, OF COVINGTON, KENTUCKY.

BRAKE-SHOE.

SPECIFICATION forming part of Letters Patent No. 354,724, dated December 21, 1886.

Application filed August 28, 1886. Serial No. 212,102. (No model.)

*To all whom it may concern:*

Be it known that I, JAMES MEEHAN, a citizen of the United States, residing at Covington, in the county of Kenton and State of Kentucky, have invented certain new and useful Improvements in Brake-Shoes, of which the following is a specification.

My invention relates to a combined brake-shoe and car-wheel dresser. Car-wheels of railway-trains usually wear a channel or groove in the tread of the wheel. After they have been in use some time this groove is of sufficient depth to occasion serious trouble, causing the wheels to raise partially out of the groove in going around curves, crossing over frogs, and at places where the distance between the rails has been varied slightly from the usual gage. This causes a jar when the wheels return to the normal gage. It also increases the strain on the cars, and thus adds to the duty of the engine. It also tends to wear off the point-rails of frogs and switches, and, again, this wearing of grooves often requires the wheels to be taken out and the tread dressed down.

My invention is designed to overcome these difficulties by providing a brake-shoe which will keep the tread of the wheel dressed to the proper shape at all times, and at the same time providing a strong and efficient brake-shoe, which will not glaze, but have a superior frictional contact with the face of the tread of the wheel. Another difficulty arises from wearing of channels or grooves in the periphery of the wheel. The flange of the wheel becomes lengthened, and cuts the bolts of switches and spring-frogs. I overcome this by forming a grooved flange shaped to fit the wheel-flange as well as the tread of the wheel, which is likewise provided with the dressing-surfaces, so as to keep the outer peripheral face of the wheel of proper shape at all times by the action of the brake itself, all of which will be fully set forth in the description of the accompanying drawings, making a part of this specification, in which—

Figure 1 is an elevation, partly in section, of my improvement. Fig. 2 is a plan view of the face of the shoe. Fig. 3 is a section on line *x x*, Fig. 1. Fig. 4 is a plan view of the face of a shoe adapted for a plain-tread wheel, and Fig. 5 is a section on line *y y*, Fig. 4.

A represents the frame for holding the brake-shoe.

B represents the dressing brake-shoe. It is preferably made of cast-iron, with steel or other cutting-sections inserted in the body of the shoe, as shown. When made of steel, these sections are preferably beveled or dovetailed and cast in position. It is necessary to have these cutting-sections lie chiefly outside of the tread of the wheel, so that the portion of the tread of the wheel which is worn by the rail will not be materially dressed down, as the wear is greater at the center, and owing to the lateral play extends somewhat outside of the line of the tread. I preferably furnish less dressing or cutting material near the center, as illustrated in Fig. 2.

1 represents cutting-sections in outside face of the shoe.

2 represents shorter sections, so as to dress off more at the outside and less toward the center.

3 represents cutting-sections in the grooved flange. The shape of these is shown in cross-section, Fig. 3. By making these sections dovetailed and casting them in position the shoe will wear a long time and keep the tread of the wheel properly dressed.

By using small sections of steel for dressing the wheel, backed by soft cast-iron, a sufficient amount of friction-surface is obtained to furnish a superior friction-shoe. At the same time a sufficient dressing or cutting surface is obtained to keep the tread in form.

In Fig. 4, 5 represents the larger cutting-sections and 4 the shorter cutting-sections, for dressing the outside faces of the plain-faced or blind-tread wheels.

6 represents bolts for attaching the shoes to the frame.

Instead of steel, vulcanized emery, corundum, or other cutting material may be employed and accomplish the same result as steel sections.

I claim—

1. A car-wheel-dressing brake-shoe having soft metallic frictional faces and hard cutting-surfaces laid flush with the face of the brake and outside of the tread portion thereof, substantially as specified.

2. A car-wheel-dressing brake-shoe having soft metallic frictional faces and hard metallic cutting-sections laid flush with the face of the brake and outside of the tread portion thereof, substantially as specified.

3. A combined car-wheel brake and dressing-shoe having the face and body of the shoe made of soft metal and interspersed with two sets of hard cutting-sections, one adapted to dress the face and the other curved and seated in a groove for dressing the flange of the wheel, substantially as specified.

4. A combined brake and car-wheel dresser composed of soft frictional metal, having two or more series of hard cutting-sections inserted in the face of the shoe, and bearing on the peripheral face of the wheel outside of the central line of tread, substantially as specified.

5. In a car-wheel brake and dresser, in combination with the frictional face of the brake, alternate longer and shorter cutting-surfaces inserted flush with the face of the brake and bearing upon the peripheral face of the wheel adjacent to the tread-line thereof, substantially as specified.

In testimony whereof I have hereunto set my hand.

JAMES MEEHAN.

Witnesses:
ROBERT ZOHNER,
JNO. S. ROEBUCK, Jr.